United States Patent [19]

Jacques

[11] Patent Number: 5,555,139
[45] Date of Patent: Sep. 10, 1996

[54] DUAL TRACK SERVO SYSTEM WITH POSITION INTERPOLATION

[75] Inventor: James O. Jacques, Santa Cruz County, Calif.

[73] Assignee: Seagate Technology, Inc., Scotts Valley, Calif.

[21] Appl. No.: 479,576

[22] Filed: Jun. 7, 1995

Related U.S. Application Data

[63] Continuation of Ser. No. 388,178, Feb. 10, 1995, abandoned, which is a continuation of Ser. No. 124,372, Sep. 20, 1993, abandoned, which is a continuation of Ser. No. 928,934, Nov. 10, 1986, abandoned.

[51] Int. Cl.$^6$ ..................................................... G11B 5/596
[52] U.S. Cl. ................................... 360/77.05; 360/77.11; 360/78.14
[58] Field of Search .......................... 360/77.05, 77.11, 360/77.14

[56] References Cited

U.S. PATENT DOCUMENTS

| Re. 32,075 | 1/1986 | Harrison et al. ...................... 360/77.08 |
| 3,994,016 | 11/1976 | Moghadan ............................ 360/77.02 |
| 4,072,990 | 2/1978 | Case et al. ................................. 360/78 |
| 4,238,809 | 12/1980 | Fujiki et al. ............................ 360/131 |
| 4,377,827 | 3/1983 | Rose ........................................... 360/77 |
| 4,805,164 | 2/1989 | Yamaguchi et al. ...................... 369/58 |

FOREIGN PATENT DOCUMENTS

| 49-117007 | 11/1974 | Japan . |
| 50-131507 | 10/1975 | Japan . |
| 54-15207 | 6/1979 | Japan . |
| 54-95214 | 7/1979 | Japan . |
| 54-158207 | 12/1979 | Japan . |
| 54-158206 | 12/1979 | Japan . |
| 55-64664 | 5/1980 | Japan . |
| 56-41562 | 4/1981 | Japan . |
| 57-3151 | 1/1982 | Japan . |
| 58-53060 | 3/1983 | Japan . |
| 59-87669 | 5/1984 | Japan . |
| 61-99978 | 5/1986 | Japan . |
| 61-151887 | 7/1986 | Japan . |
| 62-129981 | 6/1987 | Japan . |

OTHER PUBLICATIONS

Patent Abstracts of Japan, vol. 10, No. 354 (P521), English Abstract for Kokai 61–151887.
IBM Tech. Disc. Bulletin, vol. 17, No. 6, Correction of Data Track Misregistration in Servo Controlled Disk Files, A. Paton, Nov. 1974, pp. 1781–1783.

*Primary Examiner*—David L. Robertson
*Attorney, Agent, or Firm*—Flehr, Hohbach, Test Albritton & Herbert

[57] ABSTRACT

A system is disclosed wherein a plurality of discs in a stack are accessed using a vertical head array including two servo heads, one located at or near each end of the disc stack. In order to exactly center any given data head over a desired data track location in the disc stack, the error distance of the given data head relative to the data track can be determined by combining proportions of the two servo head signals from the top and bottom servo heads, their proportions being based on the vertical distance of each of the servo heads from the given data head which is to be exactly centered over a data track. If the servo distance from the disc edge is represented by $S_1$ and $S_2$, and the vertical distances from the head to the center of the servo heads is represented by $Y_1$, $Y_2$, then the general formula for calculating the error correction for centering the typical data head is:

$$E_C = \frac{1}{Y_1 + Y_2} (S_2 Y_1 + S_1 Y_2)$$

11 Claims, 3 Drawing Sheets

DETERMINATION OF DATA HEAD ERROR
CORRECTION USING TWO SERVO HEADS $S_1$ & $S_2$

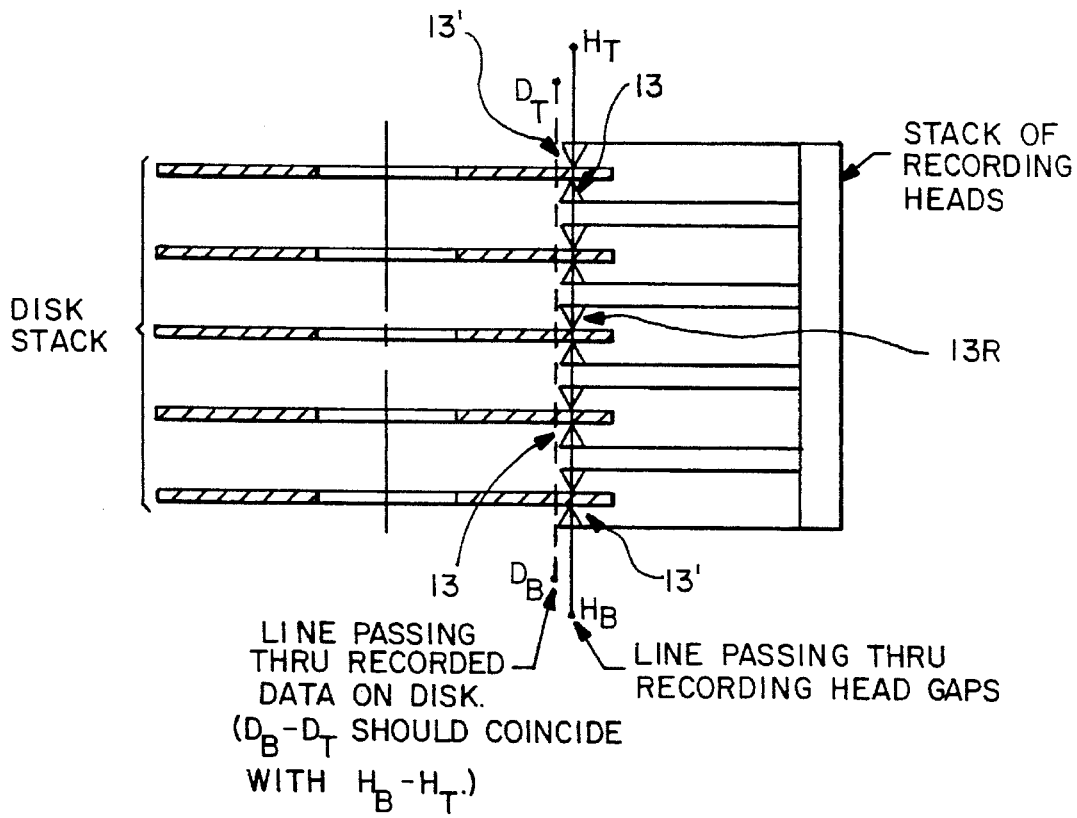
FIG.-3 HEAD TO DATA RELATIONSHIP (IDEALIZED CASE W/O ANY DISTURBANCES.)
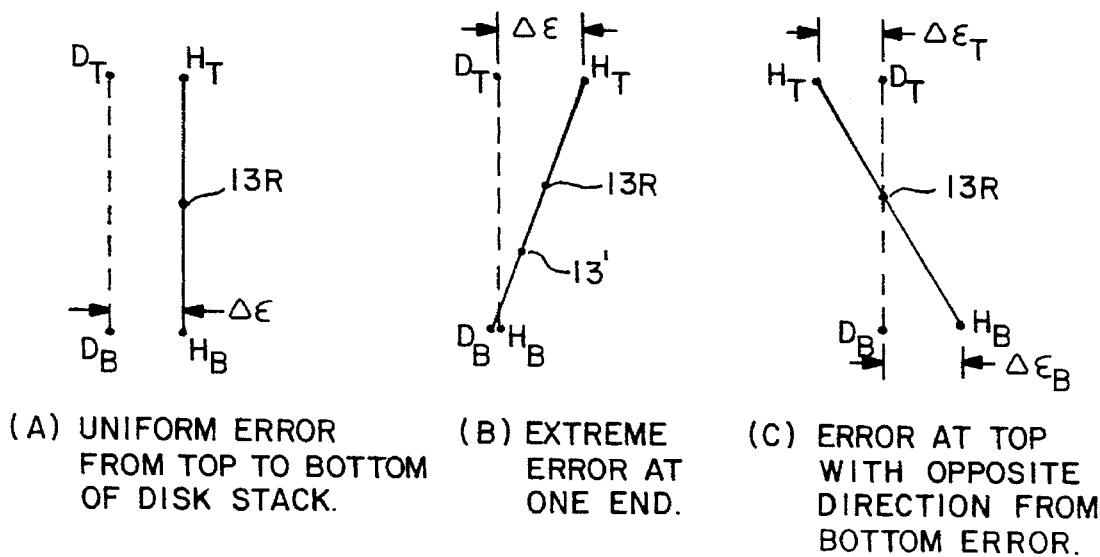
(A) UNIFORM ERROR FROM TOP TO BOTTOM OF DISK STACK.
(B) EXTREME ERROR AT ONE END.
(C) ERROR AT TOP WITH OPPOSITE DIRECTION FROM BOTTOM ERROR.
SEVERAL TYPICAL HEAD TO DATA ERROR CONDITIONS
FIG.-4

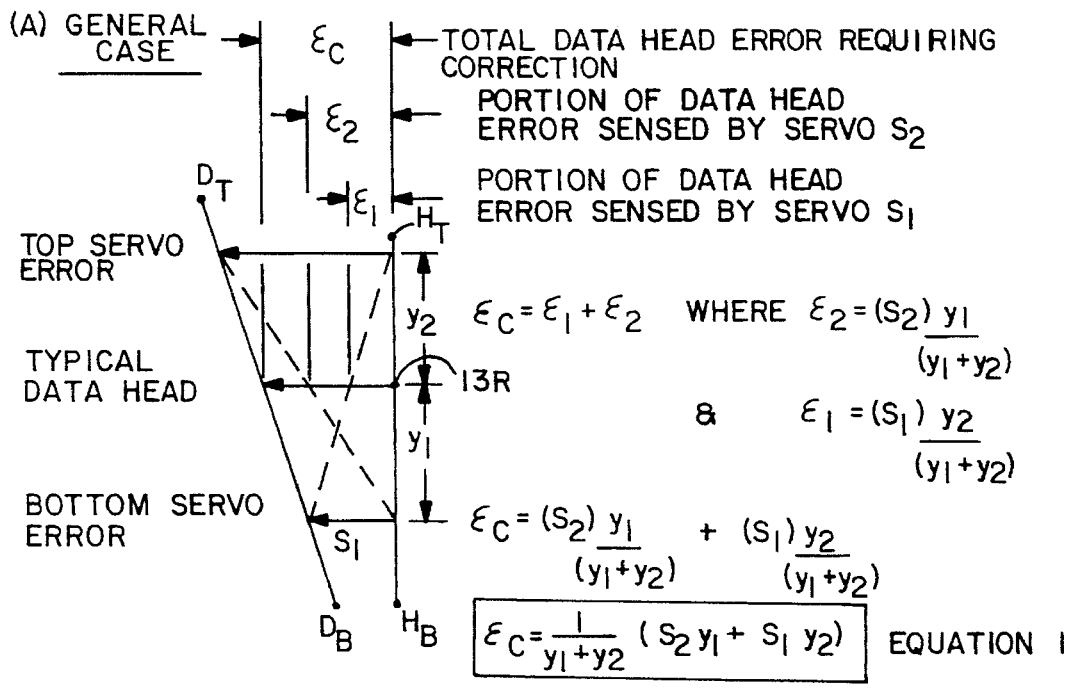
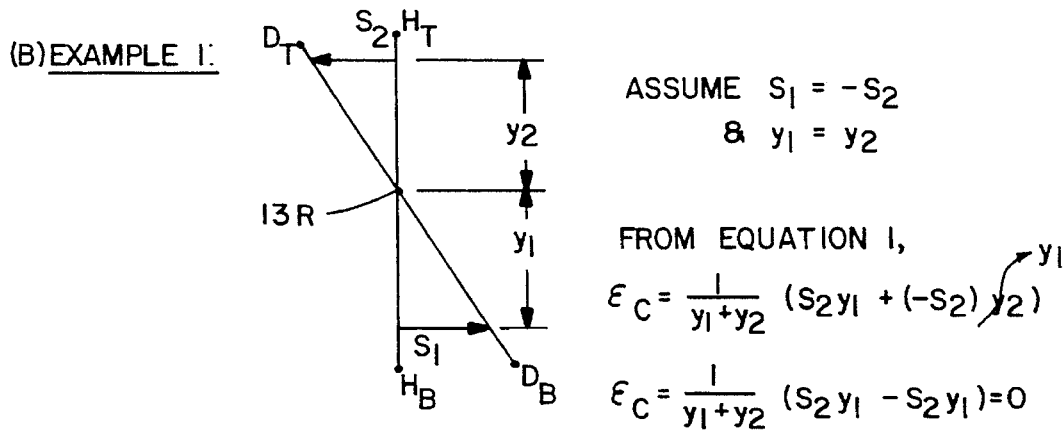
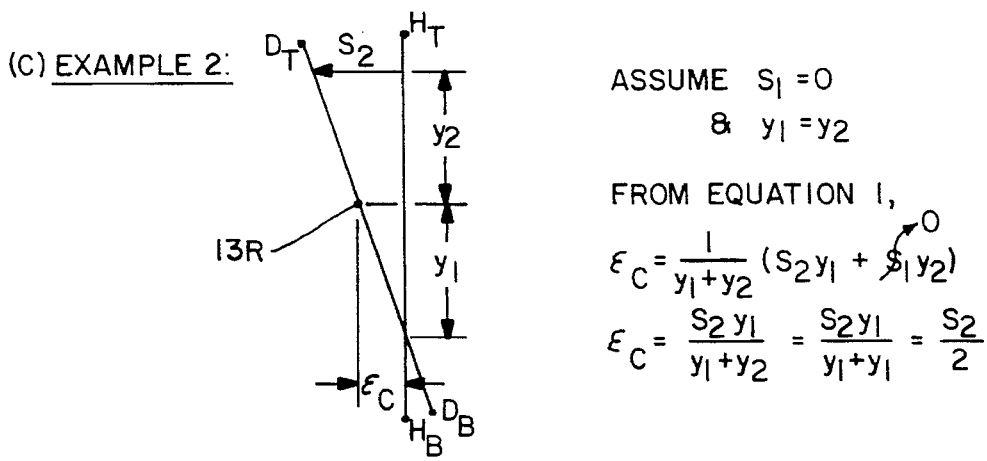
DETERMINATION OF DATA HEAD ERROR
CORRECTION USING TWO SERVO HEADS $S_1$ & $S_2$
FIG.—5

DUAL TRACK SERVO SYSTEM WITH POSITION INTERPOLATION

This is a continuation of application Ser. No. 08/388,178 filed Feb. 10, 1995, which is a continuation of application Ser. No. 08/124,372 filed Sep. 20, 1993, which is a continuation of application Ser. No. 06/928,934 filed Nov. 10, 1986, all now abandoned.

FIELD OF THE INVENTION

This invention relates to control systems and methods for translating a transducer array relative to a disc array, and more particularly to methods and apparatus for moving a transducer array relative to a rotating disc array and achieving more accurate registration between the transducers and the data tracks on the disc array in a structure wherein a plurality of heads are being aligned with tracks on a stack of discs.

BACKGROUND OF THE INVENTION

With the capability of modern electronic processors to process large masses of information, large capacity storage for data and instructions must be provided. In other words, the need is clearly established for external storage, the capacity of which can be increased at will and in which searching and reading are rapid. These requirements are met by magnetic disc storage units, which typically in large mass storage situations include a cylindrical package of vertically stacked discs.

In magnetic discs, the information is recorded in serial digital form on each face of a disc along a plurality of concentric circular tracks laid down in the circular band between the outer edge of the disc and a central circular area. The tracks may be subdivided into sectors, so that it is possible to select a single segment of track as a storage area for recording or reading. To accomplish this reading and recording, transducer elements are positioned over vertically aligned tracks on the stack of discs.

Rapid reading of the information sought is limited by the availability of means for rapid, accurate positioning of the magnetic transducers relative to the vertically aligned tracks on the stack of discs that contain the information.

Normally, read/write transducers are mounted facing one another on a pair of arms movable in a radial direction with respect to the disc and disposed in the form of a fork so as to operation both sides of the disc. In high capacity disc drives, a plurality of such pairs of recording heads are provided, operating on and facing opposite sides of a stack of discs. Each transducer must be accurately positioned, both in a normal direction with respect to the surface of the disc and in a radial direction with respect to the axis of the disc.

The positioning of the transducer is generally carried out by electromechanical systems. It is obvious that the closer the tracks are brought to one another and the smaller the tolerance in the radial distance between two tracks (with a consequent greater amount of information recordable on the surface of the disc), the greater the problems that arise with the positioning mechanism. The mechanism must not only achieve a low time of access to the information sought, but must also effect precise positioning of the transducer over the desired track. FIG. 1 schematically depicts a group of discs and a corresponding group of data heads such as are typically used in a high capacity disc drive. If the gaps of the recording heads are arranged on a line designated as $H_B$–$H_T$ (see FIG. 3), they would record information or data on the discs which would ideally form another line $D_B$–$D_T$. The two lines should be coincident with each other.

To position the transducers over the desired tracks, the disc drive unit receives from the computer an indication of the track on which the information being sought is located. The disc drive unit must be able to execute the order of the computer by positioning the transducers over the track addressed, and thereafter be able to perform the function of reading or writing (or possibly erasure) which the processor transmits to it.

However, due to dynamic and thermal disturbances which occur in disc drives, the recorded data can become displaced from the data heads. Several typical examples are diagrammed in FIG. 4. The error increases the higher the stack of discs, and the closer the tracks are spaced radially on the disc. The resulting displacement of the recorded data and the head which is trying to read the data represents an error. The maximum error is known as $\Delta E$ in the subject figure.

Disc drives often use a servo head to measure the error of the type exemplified in FIG. 4 and then correcting for it by moving the heads a corresponding amount. In known systems, a single servo head is used located at the middle or at one extreme of the disc stack. This solution works well if the error is uniform from one end to the other of the disc stack as shown in FIG. 4, section A. When a tilting, or non-parallel condition exists, as shown in FIG. 4, sections B and C, errors still occur, even after the servo head applies its correction. For example, assume the servo head was at the bottom of the disc stack and the condition shown in FIG. 4, section B occurred. No error would be detected by the servo head and no correction would be applied. However, a significant error could exist at the top of the disc stack, resulting in reading or writing data from a location that differed significantly from that actually addressed.

SUMMARY OF THE INVENTION

One objective of this invention is to provide a novel apparatus for positioning data transducers relative to rotating data storage media.

Another objective is to provide an improved servo control system for accurately aligning a stack of transducer heads with vertically aligned tracks on a stack of discs.

Yet another objective is to provide an accurate servo control system especially useful in aligning a stack of transducer heads with discs having data recorded at high data track densities.

Another objective herein is to provide a unique method and apparatus for driving a transducer carriage to rapidly move a stack of transducer heads radially across data tracks during track seeking operations and aligning the stack of heads with the tracks for reading and writing operations.

Another objective is to provide a unique servo control system which adjusts for relative tilt between a stack of transducer read/write heads and the vertically aligned tracks with which they are to be aligned for reading and writing operations, so that the error between any single head and the track with which it is to cooperate can be minimized.

Yet another objective of this invention is to adjust the positioning of a stack of read/write heads relative to a vertical set of data tracks so that the error is relatively proportioned from the top to the bottom of the stack, whereby the error is at a minimum at the center of the stack, and varies to a maximum at the top and bottom of the stack so that in every case, the error at the extreme ends of the transducer stack is minimized.

These and other objectives of this invention are achieved in a system wherein a plurality of discs in a stack are accessed using a vertical head array including two servo heads, one located at or near each end of the disc stack. In order to eliminate error due to relative tilting of the head stack relative to the discs, two servo heads are provided, one located at or near each end of the disc stack. In order to exactly center any given data head over a desired data track location in the disc stack, the error distance of the given data head relative to the data track can be determined by combining proportions of the two servo head signals from the top and bottom servo heads, their proportions being based on the vertical distance of each of the servo heads from the given data head which is to be exactly centered over a data track. If the servo distance is represented by $S_1$ and $S_2$, and the vertical distances from the head to the center of the servo heads is represented by $Y_1$, $Y_2$, then the general formula for calculating the error correction for centering the typical data head:

$$E_c = \frac{1}{Y_1 + Y_2} (S_2 Y_1 + S_1 Y_2)$$

BRIEF DESCRIPTION OF THE DRAWINGS

The objectives and advantages of this invention can be best understood by reference to the following detailed description of the drawings wherein

FIG. 3 is an expanded schematic view of the head-to-data track relationship;

FIG. 4 illustrates several typical head-to-data track error condition situations; and FIG. 5 illustrates a general case and two specific examples of the determination of data head error correction using the two servo head scheme of this invention.

DETAILED DESCRIPTION OF A PREFERRED EMBODIMENT

Figure 1:
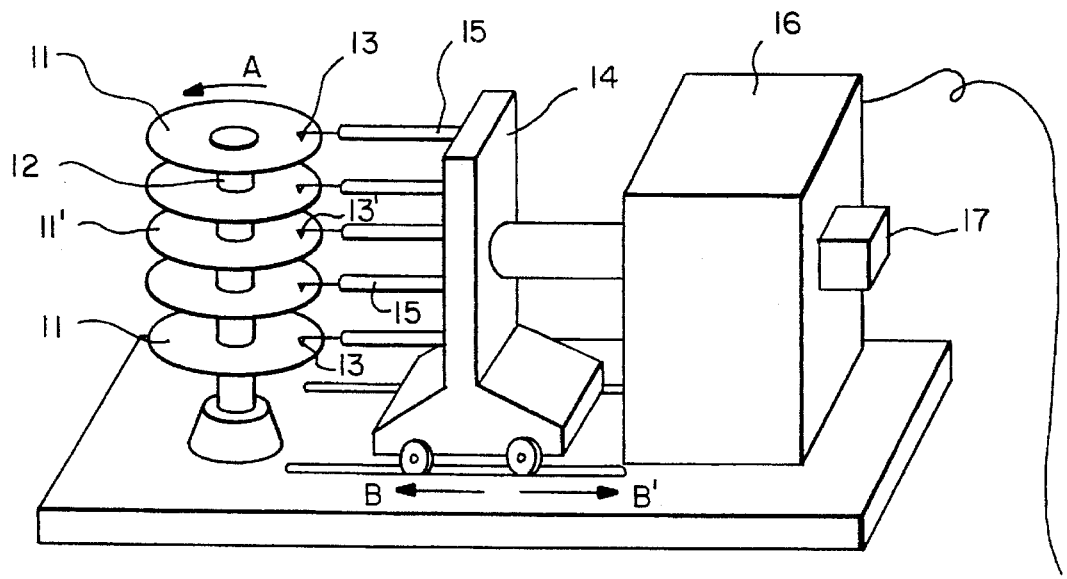
FIG. 1 is a representation of the physical elements of the disc drive which the present system is meant to control.

FIG. 1 is a perspective view schematically illustrating a mechanical portion of the typical magnetic disc storage apparatus accessing multiple discs with a plurality of magnetic heads. In FIG. 1, reference numbers 11 indicate a plurality of magnetic discs. In this embodiment, the top surface of the top disc and the bottom surface of the bottom disc contain servo information. The stack of discs is fixed on a rotating shaft 12 rotated in the direction of arrow A. The shaft is rotated by an electric motor, not shown, at a constant high speed. The numbers 13 and 13' indicate transducers, the number 13 especially indicating servo transducers which cooperate electromagnetically with the servo surfaces of the top and bottom data heads. The transducers 13 and 13' are supported by a carriage 14 by means of corresponding arms 15 and are moved by the carriage 14 forward and backward in the directions of arrows B and B'. Accordingly, the transducers 13 and 13' can travel in a radial direction relative to and slightly above or below the corresponding magnetic discs 11 and 11'.

On each of the data discs 11, a great amount of data is stored in a plurality of circular tracks (not shown) which are arranged concentrically on the disc. When a control unit commands the readout of data from a particular track of a particular disc 11, or the writing of some data onto a particular track of a particular disc 11, the corresponding data transducer 13 is moved to the desired data track. Thereafter, the data transducer 13 can read out data from the desired track or write data onto the desired data track. The above-mentioned movement of the transducers is accomplished by a linear motor 16 via the carriage 14 and arms 15.

The fine positioning of the corresponding data transducer to the desired data track on the desired disc is made under control of servo information stored in tracks on the servo disc 11' wherein servo information is read out by the servo transducer 13'. The storage and use of servo data on dedicated disc surfaces or on sectors on data discs is well known, and will not be described in detail herein. It is sufficient to note, for the purposes of this application, wherein it is desired to compensate for potential displacement of a data transducer 11 in vertical array of transducers 13, both the top and bottom discs may contain servo information, and servo transducers are provided adjacent both these top and bottom servo surfaces of the disc stack. The servo information thus read out can be supplied to a controlling circuit and the control circuit controls the motor 16 so as to locate and hold the selected data transducer on the desired data track.

Figure 2:
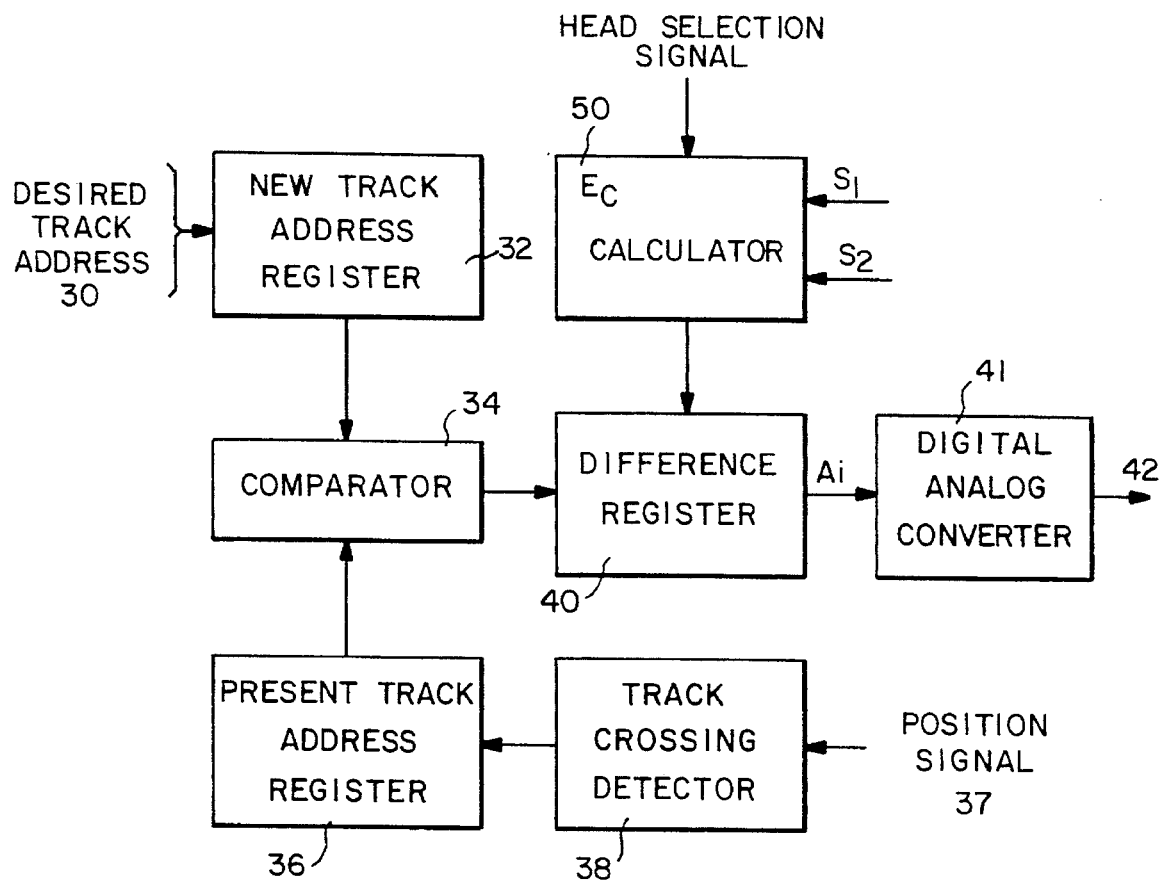
FIG. 2 is a block diagram of track seeking electronic circuitry.

FIG. 2 shows the essential elements of a control circuit that can be used to move a transducer to a desired disc track, in accordance with technology which is also well known in this art. Basically, a desired track address 30 is provided to a new track address register 32. This new track address is compared at comparator 34 with the present track address as stored in present track address register 36. The present track address register 36 can be continually updated by a position signal 37 which comprises a signal received back from the servo heads to provide a track crossing signal via track crossing detector 38. The resulting difference between the present track address from new track address register 36 and the new track address from register 32 provides a signal to difference register 40, which can be converted in D/A converter 41 to a signal 42 to drive the actuator motor.

The objective of this invention is to provide fine positioning of any data head in the vertical array of data heads relative to a data track on any disc surface. Thus, referring to FIG. 3, it can be seen that in the ideal situation the line $H_B$–$H_T$ passing through the transducer recording head gaps should coincide with a line $D_B$–$D_T$ which passes through vertically aligned data tracks on all of the discs.

It can be seen from FIG. 4 that a number of data error conditions can occur, which would result in differing error distances depending on which head was selected for access. Thus, if a data head 13R near the approximate middle of the stack were selected for access, and an error condition such a shown in FIG. 4, section A occurred where the error is uniform from the top to the bottom of the disc stack, regardless of the location of the data head 13R, relative to the servo heads $H_T$ and $H_B$, the error would be corrected. However, if the error on data head 13R were more than the error detected at the servo head 13' which might be part way up the stack or even at the extreme end of the stack, as illustrated in FIG. 4, section B, then only a partial correction or no correction at all would occur. In the example of FIG. 4, section C, the data head 13R is in fact exactly correctly located. However, the servo head would be located closer to one end or the other of the disc stack, with the result that some error would be perceived to be present, and a correction movement would occur, misaligning head 13R.

In order to eliminate this problem and provide means for making corrections in all cases, a circuit 50 has been added to the position control electronics of FIG. 2 to perform the calculations shown in FIG. 5. Specifically, the data error for any head can be calculated by providing two servo heads $H_T$ and $H_B$ preferably at the top and bottom of the stack of transducer heads, although for engineering reasons, they might be assigned to disc surfaces closer to the center of the stack. If the selected data head 13R which is to be centered exactly over the track suffers from an error $E_c$, this error can be broken down into two components. A first component E1 can be calculated from the bottom servo error S1 according to the formula:

$$E_1 = \frac{S_1 Y_2}{(Y_1 + Y_2)}$$

where $Y_1$ and $Y_2$ are the vertical distances from the selected data head 13R to the servo heads $S_1$ and $S_2$. The other component can be calculated from the servo distance error E2 using the formula:

$$E_2 = \frac{S_2 Y_1}{(Y_1 + Y_2)}$$

Therefore, the accumulated error that must be calculated and corrected for is the sum of $E_1 + E_2$ or:

$$E_c = \frac{S_2 Y_1}{(Y_1 + Y_2)} + \frac{S_1 Y_2}{(Y_1 + Y_2)}$$

The result of this calculation in exactly locating a head 13R over the desired track without overcorrection as would otherwise occur is shown in examples 1 and 2 of FIG. 5, sections B and C. For example, if the tilt of the head array is such that the center head 13R is in fact centered over the track to be read, but servo errors $S_1$ and $S_2$ are detected, then the accumulated error would be zero and no compensation would be made. Similarly, where the tilt is of the type shown in Example 2 FIG. 5 and previously illustrated in FIG. 4, section B, the correction to be applied to a head 13R is ½ of the servo error $S_2$ or would be proportional to its location between the servo heads.

Thus, the general formula known as Equation 1 in FIG. 5, section A provides for a calculation of the error at a given access head 13R so that it may be exactly centered over a desired data track.

Alterations and modifications to this invention may occur to a person of skill in the art who studies the claimed invention disclosure. Therefore, the scope of this invention is to be limited only the following claims.

What is claimed:

1. In a disc drive comprising a frame, a plurality of storage discs journaled to said frame to define a stack and rotatingly driven by motor means at a constant velocity and characterized by a multiplicity of concentric tracks on at least one of a plurality of major surfaces of said discs, and a vertical array of transducer heads in close proximity to said major surfaces, the improvement comprising:

a bi-directional mechanical rotor mounted in said frame adjacent said discs;

a head mounting structure securing said vertical array of transducer heads at one end thereof and secured for movement to said bi-directional mechanical rotor at the other end thereof;

rotor driver means connected to said bi-directional rotor for moving said head mounting structure and said vertical array of transducer heads from a first departure track to a second destination track during track seeking operations;

two of said plurality of storage discs comprising first and second servo discs separated by one or more others of said plurality of storage discs, each of said servo discs having one major surface, or servo surface, dedicated to storing only servo information thereon;

two of said transducer heads comprising first and second servo head position transducers mounted in alignment with said dedicated servo surfaces for providing head position signals, including track error, derived from said first and second servo discs; and a head position controller coupled to said first and second servo head position transducers, to said rotor driver means and to an external source of transducer head and track selection information, for calculating a track seeking command in response to a known head position and said head position signals, for commanding said vertical array of transducer heads to move from said first departure track to said second destination track during said track seeking operation, and for correcting the position of any given one of said transducer heads relative to said second destination track by proportionally averaging the head position signals fed back from said first and second servo head position transducers, said proportion depending upon the distance of said any given one of said transducer heads from said first and second servo head position transducers;

said head position controller further comprising correction distance calculating means for doing said proportional averaging function by combining proportions of said head position signals from said first and second servo head position transducers to minimize an error distance of said vertical array of transducer heads from said destination track; and wherein said correction distance calculating means calculates an error correction $E_c$ to be made in positioning said any given one of said transducer heads relative to said second destination track according to the proportion:

$$E_c = \frac{1}{Y_1 + Y_2}(S_2 Y_1 + S_1 Y_2)$$

wherein $Y_1$ is the vertical distance from said any given one of said transducer heads to said first servo head position transducer, $Y_2$ is the vertical distance from said any given one of said transducer heads to said second servo head position transducer, $S_1$ is the track error measured by said first servo head position transducer, $S_2$ is the track error measured by said second servo head position transducer, and each said any given one of said transducer heads that is located at a different vertical distance from said first and second servo head position transducers providing a different error correction $E_c$, so that fine positioning of any data transducer head in said vertical array of transducer heads is acheived relative to a track on any one of said disc surfaces.

2. The disc drive of claim 1, wherein said any given one of said data heads is a data head positioned midway between said first and second servo head position transducers.

3. The disc drive of claim 1, wherein said servo head position transducers comprise heads near the top and bottom heads in said vertical array of transducer heads.

4. The disc drive of claim 1, wherein said head position signals derived from said first and second servo head position transducers are further derived from a track crossing signal; and wherein said disc drive further comprises:

a track crossing detector adapted to receive an actuator motor position signal for detecting track crossings and generating a present track address in response to said detected track crossings;

a comparator for receiving a present track address and said second destination track address and for comparing said second destination track address with said present address and computing a comparator output signal based on said address comparison; and means coupled to said comparator means and said correction distance calculating means for combining said error correction signal $E_c$ and said comparator output signal to produce a difference signal;

said difference signal representing the actuator drive signal required to minimize the distance of said given one of said vertical array of magnetic transducer heads from said second destination track.

5. A servo control system in a magnetic disc recording device for positioning any specified one of a vertical array of magnetic transducer heads adjacent any specified one of a plurality of vertically aligned tracks on any specified one of a plurality of surfaces of a stack of rotating magnetic storage discs, said servo control system comprising:

an actuator motor having a movable output shaft;

a carriage transported by said actuator motor output shaft;

first and second servo discs in said stack, each having a major surface dedicated as a servo surface, said first and second servo surfaces being separated by one or more others of said surfaces of said magnetic storage discs;

a vertical array of transducer arms to which are mounted said vertical array of magnetic transducer heads, supported by said carriage for movement adjacent the surfaces of said rotating magnetic storage discs, two of said magnetic transducer heads comprising first and second position transducer heads for detecting servo data including track error and track crossing information on said first and second servo surfaces; and correction means coupled to said actuator motor and an external source of track selection information for calculating a position of said vertical array of magnetic transducer heads relative to said any specified one of said vertically aligned tracks based on said track selection information, said track crossing information, and a calculated proportional average of positioning information based on said servo data fed back to said correction means from said first and second position transducer heads to minimize the distance of said any specified one of said vertical array of magnetic transducer heads from said any specified one of said vertically aligned tracks;

wherein said correction means calculates an error correction $E_c$ to be made in positioning said any specified one of said transducer heads relative to said any specified one of said vertically aligned tracks according to the proportion:

$$E_c = \frac{1}{Y_1 + Y_2} (S_2 Y_1 + S_1 Y_2)$$

wherein $Y_1$ is the vertical distance from said any specified one of said transducer heads to said first servo head position transducer, $Y_2$ is the vertical distance from said any specified one of said transducer heads to said second servo head position transducer, $S_1$ is the track error measured by said first servo head position transducer, and $S_2$ is the track error measured by said second servo head position transducer.

6. The disc drive of claim 5, wherein said first and second position transducer heads comprise heads near the top and bottom heads in said vertical array of magnetic transducer heads.

7. The disc drive of claim 1, wherein said track position signals derived from said first and second servo discs are further derived from a track crossing signal; and wherein said disc drive further comprises:

a track crossing detector adapted to receive an actuator motor position signal for detecting track crossings and generating a present track address in response to said detected track crossings;

a comparator circuit receiving a present track address and a desired destination track address and comparing said destination track address with said present address and computing a comparator output signal based on said address comparison; and means, including a difference register, coupled to said comparator circuit and said error calculator circuit for receiving and combining said error correction signal $E_c$ and said comparator output signal to produce a difference signal;

said difference signal representing the actuator drive signal required to minimize the distance of said selected one of said vertical array of magnetic transducer heads from said selected one of said vertically aligned tracks.

8. The magnetic disc memory apparatus in claim 7, wherein:

said means for detecting a deviation includes an error calculator circuit (i) receiving said servo data signal and said correction servo data signal and in response to said received signals generating said secondary servo head deviation $\delta$ value, (ii) receiving an externally provided head selection signal indicating which particular one from among any of said plurality of data heads is selected for accessing said data surfaces subject to read/write access, and (iii) generating said accessing head deviation $\sigma$ from said secondary servo head deviation $\delta$ value and, the vertical distance Y of said disc surface to be accessed by said selected data head from said first servo head and said data surface to be accessed by said selected head, and (iv) storing said accessing head deviation $\sigma$ in a register; and wherein said means for controlling includes:

a comparator circuit receiving a new desired track address from a new track address storage register and a present track address from a present track address storage register, and generating a track address comparison value representing the difference between the present track address and the desired new track address;

a differencing circuit receiving said accessing head deviation $\sigma$ value and said track address comparison value and in response to said receipt generates a corrected actuator motor drive value; and a digital-to-analog converter for converting said corrected actuator motor drive signal to an analog actuator motor drive signal to drive said selected data head to the desired track address so that fine positioning of any data head in said vertical array of data heads is acheived relative to a track on any disc surface.

9. A servo control system in a magnetic disc recording device for positioning any specified one magnetic transducer head of a vertical array of magnetic transducer heads adjacent any specified one of a plurality of tracks on surfaces of a stack of rotating magnetic storage discs, said servo control system comprising:

an actuator motor having a movable output shaft;

a carriage transported by said actuator motor output shaft;

first and second servo discs in said stack, each having a major surface dedicated as a servo surface, said first and second servo surfaces being separated by one or more others of said surfaces of said rotating magnetic storage discs;

a vertical array of transducer arms on which are mounted said vertical array of magnetic transducer heads, supported by said carriage for movement adjacent the surfaces of said rotating magnetic storage discs, two of said magnetic transducer heads comprising first and second position transducer heads for detecting servo data including first and second servo error signals on said first and second servo surfaces of said first and second servo discs;

a track crossing detector receiving an actuator motor position signal for detecting track crossings and generating a present track address in response to said detected track crossings;

a first register for storing said present track address;

a second register for receiving and storing an externally provided desired new track destination address;

a comparator circuit coupled to said first and second registers for comparing said new track destination address with said present address and computing a comparator output signal based on said comparative values of said present and said new track destination addresses;

an error correction circuit for computing an accumulated error signal for said specified one of said vertical array of magnetic transducer heads in response to an externally applied head and track selection signal and a calculated proportional average of positioning information derived from said first and second servo error signals provided by said first and second position transducer heads;

means coupled to said comparator circuit and said error correction circuit for combining said accumulated error signal and said comparator output signal to produce a digital difference signal;

a third register coupled to said combining means for storing said difference signal produced by said combining means;

said digital difference signal representing the actuator drive signal required to minimize the distance of said specified one of said vertical array of magnetic transducer heads from said specified one of said vertically aligned tracks; and a digital-to-analog converter for converting said digital difference signal stored in said third register to an analog signal suitable for coupling to said actuator motor;

wherein said error correction circuit calculates the accumulated error signal to derive an error correction signal $E_c$ to be made in positioning said specified one of said transducer heads relative to said specified one of said tracks according to the relation:

$$E_c = \frac{1}{Y_1 + Y_2}(S_2 Y_1 + S_1 Y_2)$$

wherein $Y_1$ is the vertical distance from said specified transducer head to said first servo head position transducer, $Y_2$ is the vertical distance from said transducer head to said second servo head position transducer, $S_1$ is the track error measured by said first servo head position transducer, and $S_2$ is the track error measured by said second servo head position transducer.

10. The servo control system of claim 9, wherein said first and second position transducer heads comprise transducer heads near the top and bottom heads in said vertical array of magnetic transducer heads.

11. In a magnetic disc memory apparatus of the type having a plurality of disc-like magnetic recording media having a first servo surface in which servo data is recorded, a second servo surface in a least a portion of which correction servo data is recorded, and data surfaces subjected to read/write access; a first servo head for reading out the servo data recorded in said first servo surface and generating a servo data signal indicating said read out servo data; a second servo head for reading out the correction servo data recorded in said second servo surface and generating a correction servo data signal indicating said read out correction servo data; a plurality of data heads for writing data into said data surfaces and reading out data from said data surfaces; and head drive means, fixed to said heads, for integrally driving said heads; a method for correcting the deviation of any given data head accessing any given data surface comprising the steps of:

receiving said servo data signal;

receiving said correction servo data signal;

computing said secondary servo head deviation $\delta$ value in response to said received servo data and correction servo data signals;

receiving an externally provided head selection signal indicating which particular one from among any of said plurality of data heads is selected for accessing said data surfaces subject to read/write access;

computing said accessing head deviation $\sigma$ from said secondary servo head deviation $\delta$ value and the vertical distance Y of said disc surface to be accessed by said selected data head from said first servo head and said data surface to be accessed by said selected head according to the equation $\sigma = \delta \cdot Y/X$, where X is a distance between said first and second servo heads and Y is a distance between said first servo head and the disc surface to be accessed by said any given accessing head;

storing said accessing head deviation $\sigma$ in a register;

receiving a new desired track address from a new track address storage register;

receiving a present track address from a present track address storage register;

computing a track address difference comparison value representing the difference between the present track address and the desired new track address;

computing a corrected actuator motor drive value by compensating said track difference comparison value by said accessing head deviation $\sigma$ value in response to said receiving of said accessing head deviation $\sigma$ value and said track address comparison value; and converting said digital corrected actuator drive value to an analog actuator motor drive signal to drive said selected data head to the desired track address;

whereby fine positioning of any data head in said vertical array of data heads is acheived relative to a track on any disc surface.

* * * * *